US011436244B2

(12) United States Patent
Portisch et al.

(10) Patent No.: US 11,436,244 B2
(45) Date of Patent: Sep. 6, 2022

(54) INTELLIGENT DATA ENRICHMENT USING KNOWLEDGE GRAPH

(71) Applicant: SAP SE, Walldorf (DE)

(72) Inventors: Jan Portisch, Bruchsal (DE); Sandra Bracholdt, Dielheim (DE); Oliver Huth, Worms (DE); Volker Saggau, Bensheim (DE)

(73) Assignee: SAP SE, Walldorf (DE)

( * ) Notice: Subject to any disclaimer, the term of this patent is extended or adjusted under 35 U.S.C. 154(b) by 5 days.

(21) Appl. No.: 17/160,153

(22) Filed: Jan. 27, 2021

(65) Prior Publication Data

US 2022/0237185 A1 Jul. 28, 2022

(51) Int. Cl.
*G06F 16/24* (2019.01)
*G06F 16/2458* (2019.01)

(52) U.S. Cl.
CPC .............................. *G06F 16/2465* (2019.01)

(58) Field of Classification Search
CPC .. G06F 16/2465; G06F 16/367; G06F 16/334; G06F 16/288
See application file for complete search history.

(56) References Cited

U.S. PATENT DOCUMENTS

| 10,853,150 | B1* | 12/2020 | Bahrami | G06N 5/022 |
| 2018/0239816 | A1* | 8/2018 | Di Balsamo | G06F 16/3329 |
| 2022/0043826 | A1* | 2/2022 | Zorin | G06F 16/2365 |
| 2022/0093268 | A1* | 3/2022 | Li | G16H 10/60 |

OTHER PUBLICATIONS

Kasey Panetta, "5 Trends Appear on the Gartner Hype Cycle for Emerging Technologies, 2019—Smarter With Gartner," downloaded from https://www.garter.com/smarterwithgartner/5-trends-appear-on-the-gartner-hype-cycle-for-emerging-technologies-2019, printed Jan. 20, 2021, 12 pages.
Heiko Paulheim, "Knowledge Graph Refinement: A Survey of Approaches and Evaluation Methods," *Semantic Web*, 2015, 23 pages.
Shvaiko et al., "Ontology Matching: OM-2018, Proceedings of the ISWC Workshop," Dec. 2018, 234 pages.
Shvaiko et al., "Ontology Matching: OM-2019, Proceedings of the ISWC Workshop," Dec. 2019, 202 pages.
Wikipedia, "Relation (database)," printed Dec. 2, 2020, 4 pages.
Wikipedia, "View (SQL)," printed Dec. 2, 2020, 3 pages.

\* cited by examiner

*Primary Examiner* — Baoquoc N To
(74) *Attorney, Agent, or Firm* — Klarquist Sparkman, LLP

(57) ABSTRACT

A computer-implemented method can receive a source table containing data tuples and a source schema defining attributes of the data tuples, and match the source schema to an ontology of a knowledge graph. The knowledge graph can include a plurality of instances and the ontology defines properties of the plurality of instances. The computer-implemented method can link the data tuples to respective instances in the knowledge graph, and identifying non-matching properties of the respective instances, wherein the non-matching properties are defined in the ontology and not matched to the source schema. The computer-implemented method can obtain property values associated with the non-matching properties from the knowledge graph, and add one or more of the non-matching properties and the associated property values to respective data tuples of the source table.

20 Claims, 15 Drawing Sheets

11,436,244 B2

INTELLIGENT DATA ENRICHMENT USING KNOWLEDGE GRAPH

BACKGROUND

Data is essential for enterprises. While enterprise analytics can be based on internal data collected and maintained by the enterprises, data analytics using both internal data and external data—which can be publicly available or provided by third parties—can lead to a competitive advantage. However, adding external data manually is often cumbersome. This is particularly true if the person responsible for managing the data is not familiar with the external databases. Additionally, external data sets are typically not integrated into an enterprise's analytics environment. Accordingly, there remains a need for an improved system and method for automatic data enrichment which can intelligently find and import relevant data from external knowledge sources.

DETAILED DESCRIPTION

Example 1—Overview of Data Enrichment

Data is essential for contemporary businesses. Enterprises rely on comprehensive and accurate data to guide their research and development plans and/or formulate marketing, sales and customer service strategies. While in the early days of enterprise analytics, most enterprises relied only on internal data, enterprises today often seek competitive advantages by merging external data with internal data in order to make more informed decisions.

Data enrichment, or data augmentation, generally refers to the process of enhancing internal data by supplementing missing or incomplete data from external sources. Despite the potential benefits of data enrichment, obstacles exist that prevent many enterprises from effectively implementing such a strategy. One obstacle is that many data enrichment tools require extensive human knowledge and interactions. For example, a user must have a thorough knowledge of the internal data (i.e., she must have a deep understanding of what data is currently available) before she looks for external data to supplement the internal data. When she does seek external data, she must be aware of what external data sources are available, how comprehensive, accurate, and/or up-to-date each external data source is, whether those external data sources are free for the public or privately owned, and if the latter, how expensive they are. When she does have access to an external database, she may need to spend significant amount of time to get familiar with the structure and interface of the external database. And she may have to spend even more time to explore and/or search the external database to identify data that may be relevant for her purposes. Even if she can find relevant data from the external database, she may find herself lacking appropriate tools to import such data, and have to rely on cumbersome manual input.

In addition, external data sets are typically not integrated into an enterprise's analytics environment. After previously importing some external data into an enterprise's internal database by some users, it may be difficult to identify, trace, and/or segregate data based on their original sources. This could pose serious challenges for data quality control and regulatory compliance of data integrity.

Thus, it would be advantageous for an improved intelligent data enrichment system that can overcome the shortcomings described above. Such intelligent data enrichment technologies can be applied across a wide variety of enterprise software environments.

Example 2—Example Overview of Intelligent Data Enrichment System

Figure 1:
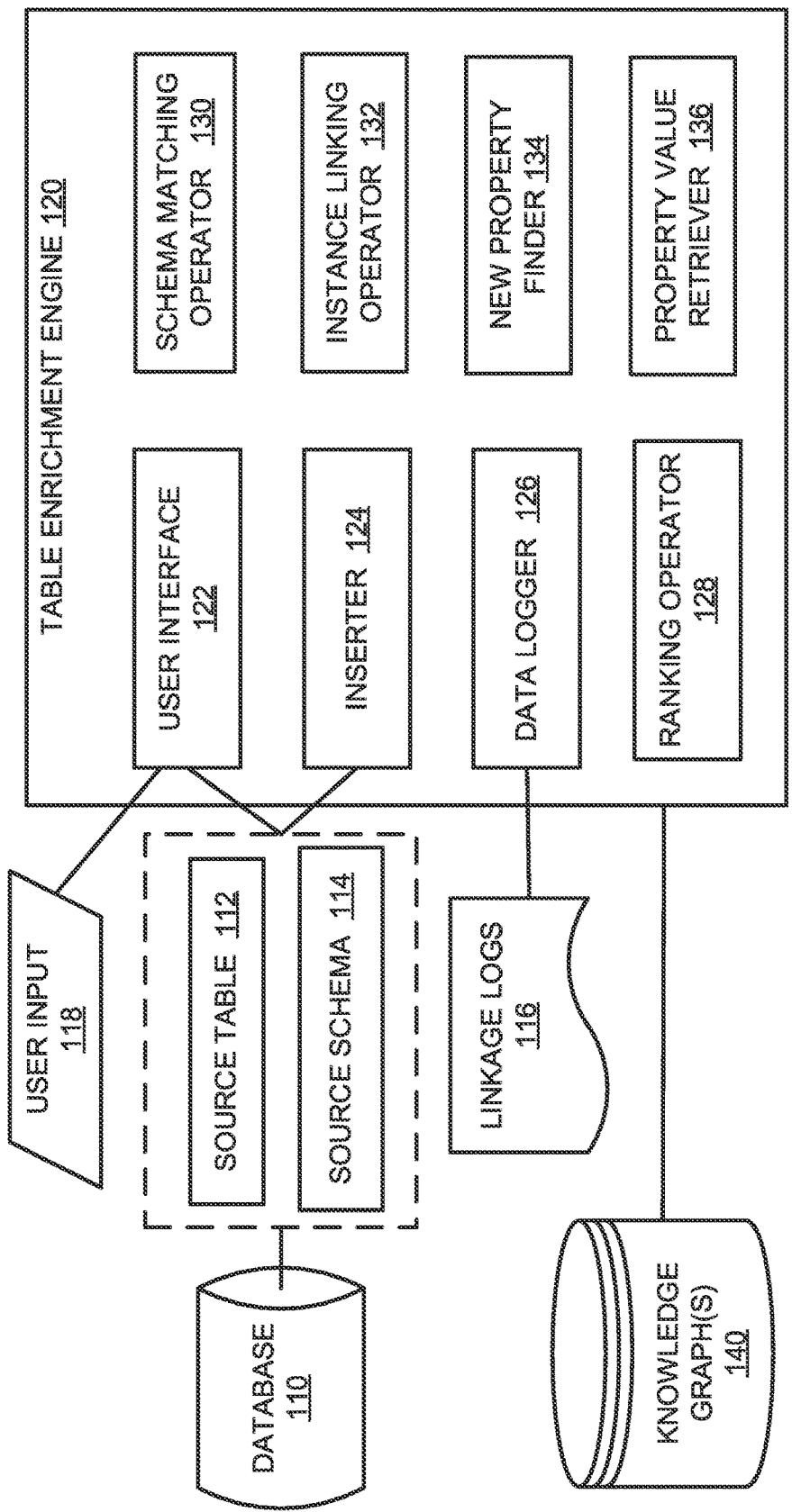
FIG. 1 is an overall block diagram of an example system including a table enrichment engine that is configured to implement intelligent data enrichment using a knowledge graph.

FIG. 1 shows an overall block diagram of an example intelligent data enrichment system 100 that can be implemented in an enterprise's analytics environment.

As shown, intelligent data enrichment system 100 can be configured to enrich or augment data stored in an internal database 110, which can include a plurality of source tables 112. As described herein, a source table 112 can be populated with data tuples (also referred to as data records). The data tuples can have a plurality of attributes which can be defined by a source schema 114 associated with the source table 112. In certain examples, data stored in a source table 112 can be organized into a plurality of rows and a plurality of columns, wherein the rows correspond to the data tuples and the columns correspond to the attributes. In certain examples, the source table 112 can represent a database view defined by a query of the database 110. For example, a database view can contain a subset of data retrieved from one database table using a query command, or combine data retrieved from two or more database tables (e.g., using joins).

As described herein, the source table 112 can be enriched by a table enrichment engine 120, which can include a user interface 122, an inserter 124, a data logger 126, a ranking operator 128, a schema matching operator 130, an instance linking operator 132, a new property finder 134, and a property value retriever 136. The table enrichment engine 120 can be configured to implement an intelligent data enrichment algorithm, as described further below.

Through the user interface 122, the table enrichment engine 120 can receive a user input 118 which specifies which source table 112 needs to be enriched. In certain examples, the source schema 114 associated with the source table 112 can be automatically determined (e.g., the database 110 can maintain a record that links source tables 112 to respective source schema 114). In certain examples, the user input 118 can specify the source schema 114 associated with the source table 112. In certain examples, the user input 118 can also specify external source(s) for enrichment. For example, the user input 118 can specify one or more knowledge graphs 140, from which the source table 112 can retrieve supplemental data. In other examples, the table enrichment engine 120 can maintain one or more default knowledge graphs 140 for data enrichment. In any of the examples described herein, any of the knowledge graphs 140 can be in the public domain and thus free, and/or can be proprietary and can be purchased or subscribed (e.g., pay-for-usage) from a private entity.

As described in more details below, the schema matching operator 130 can match the source schema 114 associated with the source table 112 to an ontology of a knowledge graph 140. The knowledge graph 140 can include a plurality of instances and the ontology can define properties of the instances. The instance linking operator 132 can link the data tuples in the source table 112 to respective instances in the knowledge graph 140. The new property finder 134 can identify non-matching properties of the respective instances, wherein the non-matching properties are defined in the ontology but not matched to the source schema 114. The property value retriever 136 can then obtain property values associated with the non-matching properties from the knowledge graph 140.

In certain examples, the non-matching properties and the associated property values can be presented to a user through the user interface 122. The user can select which non-matching properties should be used to enrich the source table 112. In certain examples, the ranking operator 128 can rank the non-matching properties of the respective instances so as to create a ranked list of non-matching properties and the associated property values, which can be presented to the user through the user interface 122 for selection.

Based on the user's selection, the inserter 124 can add one or more of the non-matching properties and the associated property values to respective data tuples of the source table 112. In certain examples, the inserter 124 can automatically add some non-matching properties and the associated property values to respective data tuples of the source table 112 without the user's input. For example, after the non-matching properties are ranked by the ranking operator 128, the inserter 124 can automatically add the top-ranked K non-matching properties and the associated property values to respective data tuples of the source table 112, where K is a predefined integer (e.g., 1, 2, 3, etc.).

In certain examples, the data logger 126 can log data linkage information in linkage logs 116. The data linkage information can record various information pertaining to the data enrichment operation. For example, the data linkage information can record regarding who performed the data enrichment operation, which non-matching properties have been added to respective data tuples of the source table 112, what knowledge graph(s) 140 have been used for the data enrichment, what ranking criteria have been used to rank the non-matching properties, the date and time when the non-matching properties have been added to the source table 112, and/or the like.

In certain examples, after selected non-matching properties and the associated property values are added to respective data tuples of the source table 112, the source schema 114 associated with the source table 112 can be updated to record the non-matching properties added to the source table 112.

In practice, the systems shown herein, such as the intelligent data enrichment system 100, can vary in complexity, with additional functionality, more complex components, and the like. For example, there can be additional functionality within the table enrichment engine 120. Additional components can be included to implement security, redundancy, load balancing, report design, and the like.

The described computing systems can be networked via wired or wireless network connections, including the Internet. Alternatively, systems can be connected through an intranet connection (e.g., in a corporate environment, government environment, or the like).

The intelligent data enrichment system 100 and any of the other systems described herein can be implemented in conjunction with any of the hardware components described herein, such as the computing systems described below (e.g., processing units, memory, and the like). In any of the examples herein, the attributes of source schema, the ontology of the knowledge graph, the non-matching properties and the associated property values, and the like can be stored in one or more computer-readable storage media or computer-readable storage devices. The technologies described herein can be generic to the specifics of operating systems or hardware and can be applied in any variety of environments to take advantage of the described features.

Example 3—Example Cloud-Based Intelligent Data Enrichment Services

In certain examples, the table enrichment engine can be implemented in a customer computer, for example, as a part of an on-premise enterprise resource planning software installed on a company's local computers or servers. In other embodiments, the table enrichment engine can be implemented in a cloud which is hosted on a vendor's servers and can be accessed through a web browser.

Figure 2:
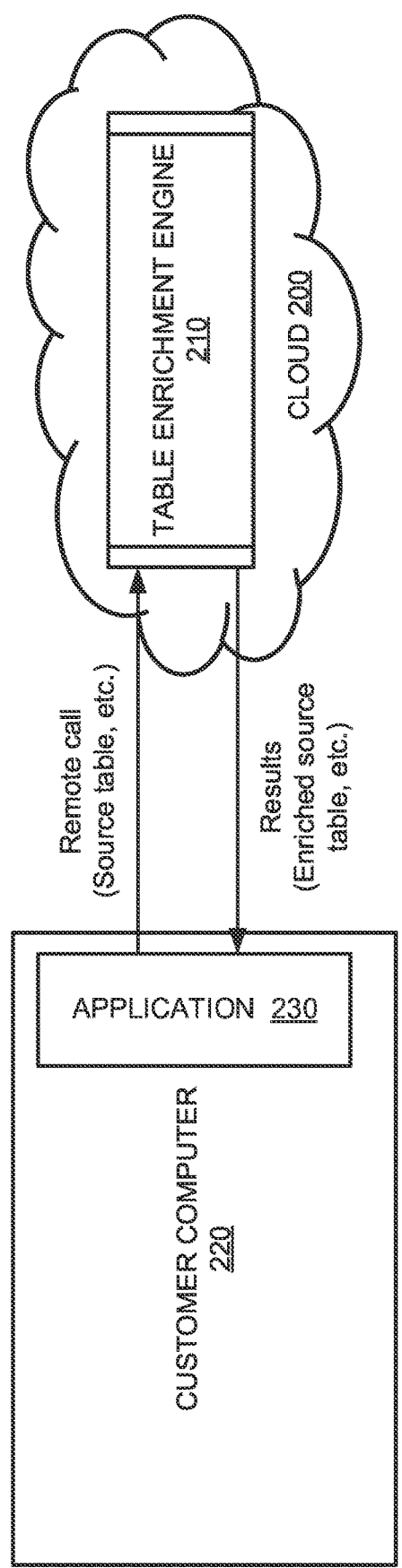
FIG. 2 is a block diagram illustrating a cloud-based table enrichment engine in communication with a software application running on a customer computer.

For example, FIG. 2 shows a table enrichment engine 210 (similar to 120) located on a cloud 200. A customer computer 220 can run a software application 230, which includes an application programming interface (API) that can communicate with the cloud-based data enrichment engine 210. Specifically, the application 230 can make remote calls and send source table to be enriched and source schema associated with the source table to the data enrichment engine 210. Then the data enrichment engine 210 can enrich the source table based on one or more knowledge graphs as described more fully below. The results (e.g., enriched source table and updated source schema) can be returned from the table enrichment engine 210 to the application 230.

Figure 3:
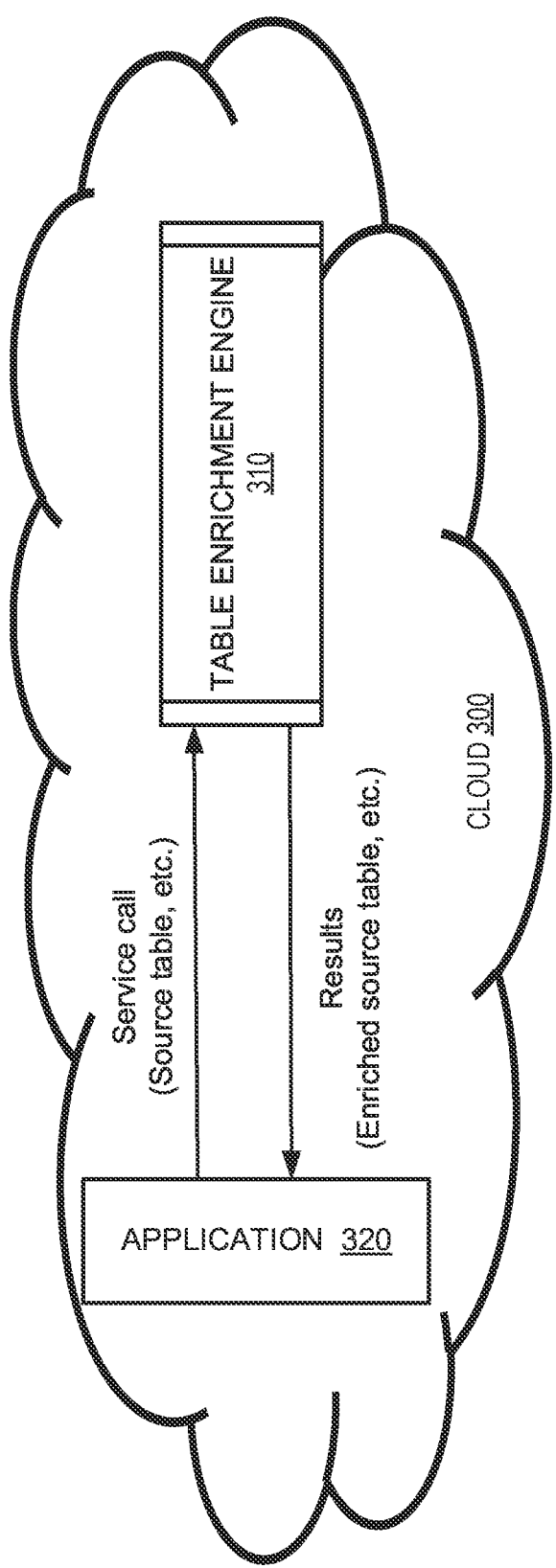
FIG. 3 is a block diagram illustrating a cloud-based table enrichment engine integrated with a subscription-based software application running in the cloud.

In another example, the data enrichment service can be run completely in the cloud and a customer can subscribe to such a service. As shown in FIG. 3, in such circumstances, both the data enrichment engine 310 (similar to 120) and the software application 320 that calls for service and receives results from the data enrichment engine 310 can be run in the cloud 300.

Example 4—Example Knowledge Graph

As noted above and describe more fully below, the data enrichment engine can supplement new attributes and corresponding attribute values to a source table based on analysis of knowledge graphs.

Generally, a knowledge graph is a special type of database that maintains knowledge or information in a graph form. A typical knowledge graph includes a plurality of nodes representing objects (also being referred to "entities") and a plurality of edges connecting the nodes, wherein the edges represent relationship between the objects (e.g., is a parent of, is located in, etc.). One common type of knowledge graph is based on the resource description framework (RDF), which models statements of facts or web resources in expressions of the form subject-predicate-object, known as triples. For example, two nodes connected by an edge can describe a fact, which can be represented as (subject, predicate, object) triples.

Figure 4:
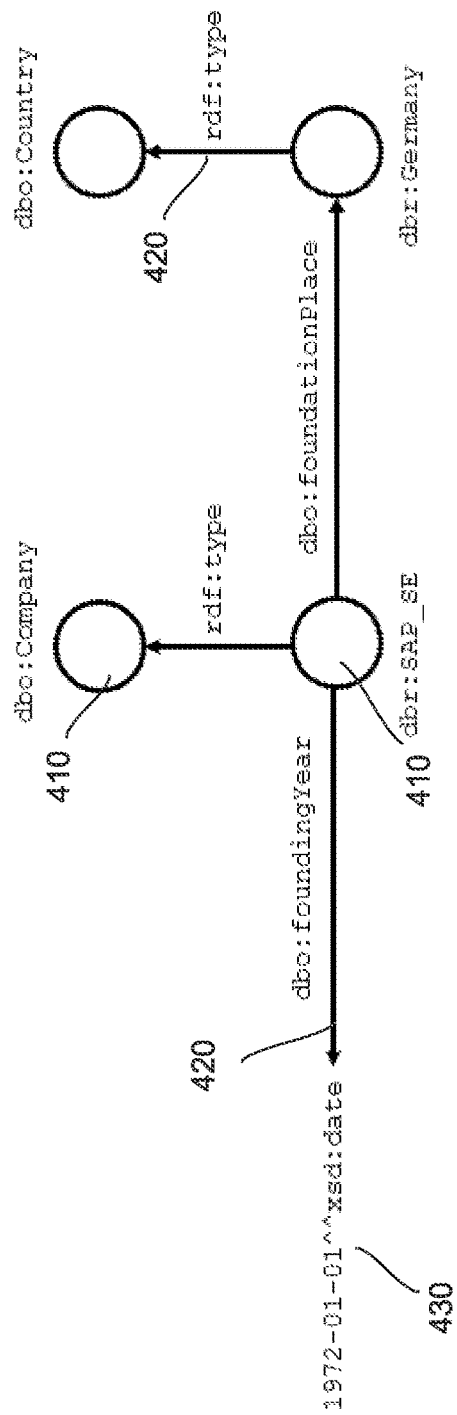
FIG. 4 is an example diagram illustrating a portion of a knowledge graph.

As an example, FIG. 4 shows a portion of a knowledge graph 400 containing four nodes 410 respectively represent objects of "SAP_SE," "Germany," "Company," and "Country." A specific date value "1972-01-01" can also be deemed as a null node 430. The knowledge graph 400 also includes edges 420 with specific properties, such as "rdf:type," "dbo:foundationPlace," and "dbo:foundingYear," which represent relationships between the nodes 410. A knowledge graph can have predefined property prefixes (e.g., DBpedia has property prefixes such as "rdf," "dbo," "dbp," etc.). As shown, several facts can be contained in this knowledge graph, such as (SAP_SE, is a type of, Company), (SAP_SE, has foundation place, Germany), (Germany, is a, Country), and (SAP_SE, has founding year, 1972-01-01).

In some knowledge graphs (e.g., RDF knowledge graphs), it is also possible to apply reasoning to the (subject, predicate, object) triples (e.g., rather than stating explicitly that "Germany" is a country as exemplified in FIG. 4). For example, according to a preconstructed reasoning rule, every object of "dbo:foundationPlace" is a country (by setting the property range). Thus, through reasoning, the triple (dbr: Germany, rdf:type, dbo:Country) can be "reasoned" or "materialized" into a statement of fact: "Germany is a country." Other reasoning rules can be similarly constructed. The technology described herein also applies to such reasoning-based knowledge graphs (e.g., the knowledge graph can be first materialized before performing the intelligent labeling algorithm described more fully below).

Typically, an object represented by a node contains an identifier (ID) and a label representing name of the object. The node can also have an associated uniform resource identifier (URI) (sometimes also referred to as uniform resource locator, or URL). The relationships represented by edges can be characterized by a set of edge properties that are specific to the knowledge graph. Each edge property can also have a unique URI.

Some of the nodes may represent more specific objects and can be deemed as instances contained in the knowledge graph. For example, "SAP_SE" can be an instance representing a specific company, and "Germany" can be an instance representing a specific country. Some of the nodes may represent more generic objects and can be deemed as class objects, the aggregation of which can define an ontology of the knowledge graph. As described herein, the ontology of a knowledge graph can contain the schema or common vocabulary that defines edges and properties of the nodes that are available in the knowledge graph. For example, "Company" is a class object that captures the common concept shared by many individual companies including "SAP_SE," and "Country" is a class object that captures the common concept shared by many individual countries including "Germany." The ontology of knowledge graph depicted in FIG. 4 defines at least the following properties for the instance "SAP_SE": "rdf:type," "dbo:foundationPlace," and "dbo:foundingYear."

Compared to relational databases, the knowledge graph has a more flexible data structure because the types of data provided by the knowledge graph can vary. For example, properties associated with different instances can differ even though these instances share the same class object (e.g., "SAP_SE" and "BASF_SE" can have different property data available although they share the same class object "Company"). On the other hand, a relational database can be represented in a knowledge graph format, i.e., the knowledge graph can be a higher-level abstraction of the relational database.

In certain examples, whether a specific node (e.g., "Germany") represents an instance object or a class object can depend on the underlying model or concept. According to one example, whether the term "Germany" belongs to an ontology or is an instance can be determined by checking the rdf:type property: If the type is owl:Class, then it belongs to the ontology; otherwise it is deemed an instance.

In certain examples, the nodes in a knowledge graph can be organized in a hierarchical structure where a lower-level node (representing a more specific object) may be connected to a higher-level node (representing a more generic object) by one or more edges. The lower-level node (or the lower-level object it represents) can be called a descendant of the higher-level node (or the higher-level object it represents), and the higher-level node (or the higher-level object it represents) can be called an ancestor of the lower level node (or the lower-level object it represents).

For a given knowledge graph, an ontology can be created by describing the class objects with a list of properties represented by the edges. For example, the DBpedia ontology currently covers over 600 class objects which form a subsumption hierarchy and are described by over 2,000 different edge properties.

Since knowledge graphs contain many real-world entities/objects/instances and their corresponding properties, they can be valuable sources for enriching source tables in enterprise databases.

Figure 5:
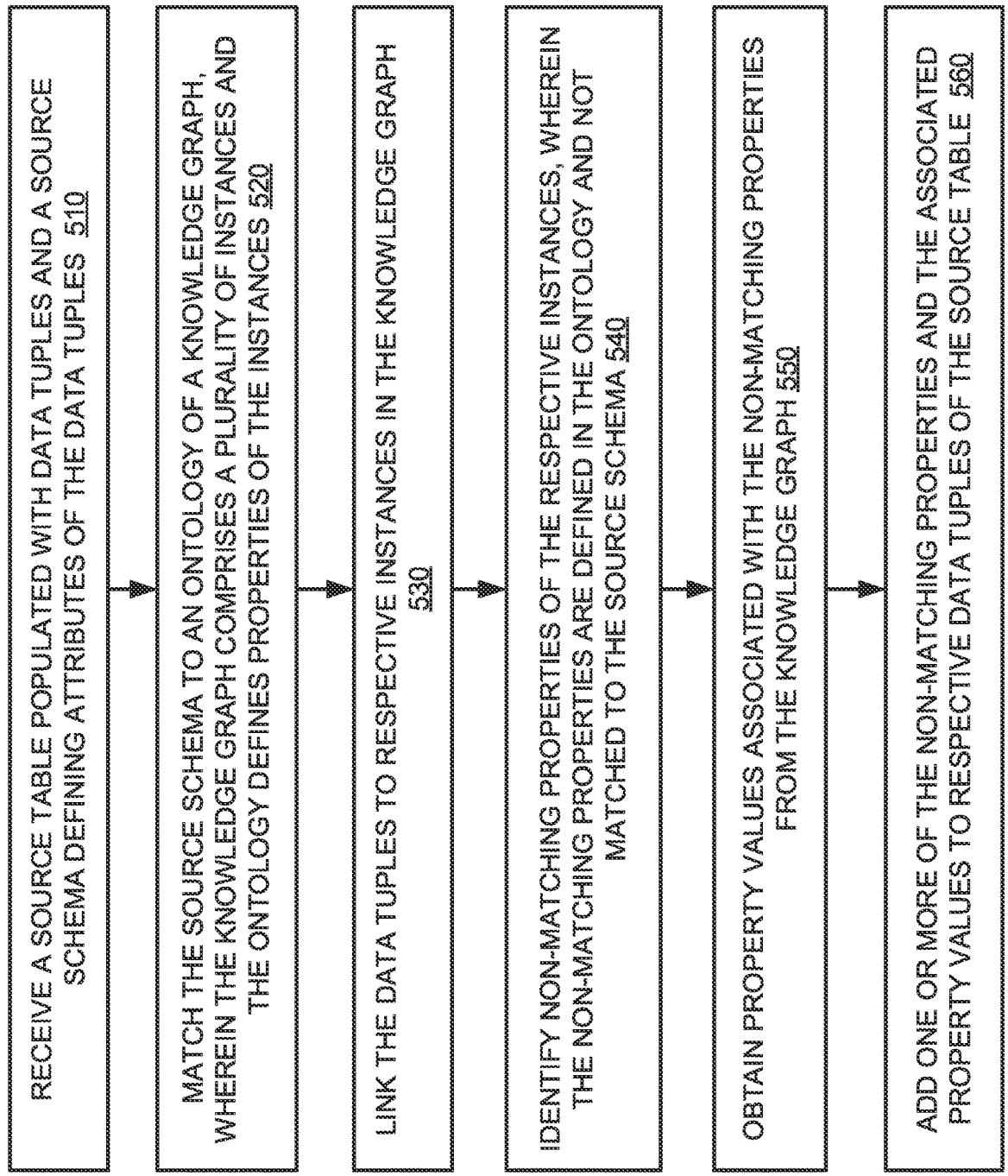
FIG. 5 is a flowchart illustrating an example overall method of intelligent data enrichment using a knowledge graph.

Example 5—Example Overall Method of Implementing Intelligent Data Enrichment Algorithm FIG. 5 is a flowchart of an example overall method 500 of implementing an intelligent data enrichment algorithm and can be performed, for example, by the data enrichment system 100 of FIG. 1.

For example, at 510, the table enrichment engine (e.g., 120) can receive a source table (e.g., 112) populated data tuples and a source schema (e.g., 114) defining attributes of the data tuples. At 520, the table enrichment engine (e.g., via the schema matching operator 130) can match the source schema to an ontology of a knowledge graph (e.g., 140). As described above, the knowledge graph can comprise a plurality of instances and the ontology defines properties of the instances. At 530, the table enrichment engine (e.g., via the instance linking operator 132) can link the data tuples to respective instances in the knowledge graph. At 540, the table enrichment engine (e.g., via the new property finder 134) can identify non-matching properties of the respective instances. As explained further below, the non-matching properties are defined in the ontology and not matched to the source schema. At 550, the table enrichment engine (e.g., via the property value retriever 136) can obtain property values associated with the non-matching properties from the knowledge graph. At 560, the table enrichment engine (e.g., via the inserter 124) can add one or more of the identified non-matching properties and the associated property values to respective data tuples of the source table.

As described further below, in certain examples, the non-matching properties identified by the table enrichment engine can be ranked (e.g., by the ranking operator 128) according to one or more criteria. In certain examples, the non-matching properties (which can be ranked or not ranked) and the associated property values can be presented to a user on a user-interface (e.g., 122) so that the user can select which one or more of the non-matching properties and the associated property values are to be added to respective data tuples of the source table. In other examples, after the non-matching properties are ranked, the table enrichment engine can automatically add one or more top-ranked non-matching properties and the associated property values to respective data tuples of the source table.

In certain examples, after the source table has been enriched (e.g., by adding selected non-matching properties and the associated property values), the source schema associated with the source table can be updated to record the non-matching properties added to the source table. In certain examples, after the source table has been enriched, the table enrichment engine (e.g., via the data logger 126) can log data linkage information (e.g., in linkage logs 116).

The method 500 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, "receive" (e.g., from a receiver's perspective) can also be described as "send" from a different (e.g., sender's) perspective.

Example 6—Example Intelligent Data Enrichment Algorithm Overview

In an example embodiment, the intelligent data enrichment algorithm requires the following information to run: a source table (D) containing one or more data tuples, a source schema (S) defining attributes of the data tuples, and at least one target knowledge graph (KG) comprising a plurality instances (I) and an ontology (O) defining properties of the instances. In some examples, the source table (D) and the source schema (S) can be provided by a database owned by an enterprise and are available to current users of the database. As noted above, the target knowledge graph (KG) can be a public/free knowledge graph or a private/proprietary knowledge graph.

In one specific example, the following can be provided as input to the intelligent data enrichment algorithm:
The target knowledge graph (KG).
Source table (T∈S) includes a set of columns (C), where |C|>0 and an individual column is referred to as c. Here, ICI denotes the number of columns in T.
Table content of interest (TC) which is a set of data tuples, where |TC|>0 and each tuple consists of n elements e, where n=|C|. Here, |TC| denotes the number of data tuples in TC.

The output of the intelligent data enrichment algorithm can be a list of columns (e.g., new attributes) with associated values for the data tuples in TC. In certain examples, the list of columns (or new attributes) can be ranked based on one or more criteria.

An example pseudo-code implementation of the intelligent data enrichment algorithm is illustrated in the table below.

METHOD extension_proposal(T, TC, KG):
schema_alignment=match_schema(T, TC, KG)
linkage=link_records(T, TC, KG, schema_alignment)
Map<tuple, List<col_name, value>>result;
FOR EACH tuple in TC:
List<col_name, value>e=derive_non_matching_values (linkage, schema_alignment, KG) result.put(tuple, rank (e))
RETURN result In the pseudo-code implementation described above, the function match_schema can implement a schema matching operation (e.g., by the schema matching operator 130), which matches the source schema associated with the source table (T) or table content of interest (TC) to the ontology of the knowledge graph (KG). The function link_records can implement a linking operation (e.g., by the instance linking operator 132) that links the data tuples in the table content of interest (TC) to respective instances in the knowledge graph (KG). The function Map can implement a mapping operation that maps each data tuple to a respective property tuple list, as described further below. The function derive_non_matching_values can implement a searching operation (e.g., by the new property finder 134 and property value retriever 136) that identifies non-matching properties of the respective instances. The function rank can implement a ranking operation (e.g., by the ranking operator 128) that ranks the non-matching properties according to one or more criteria. In certain examples, the table content of interest (TC) can be a subset of the source table (T). In one special case, the table content of interest (TC) is the same as the source table (T).

Figure 6:
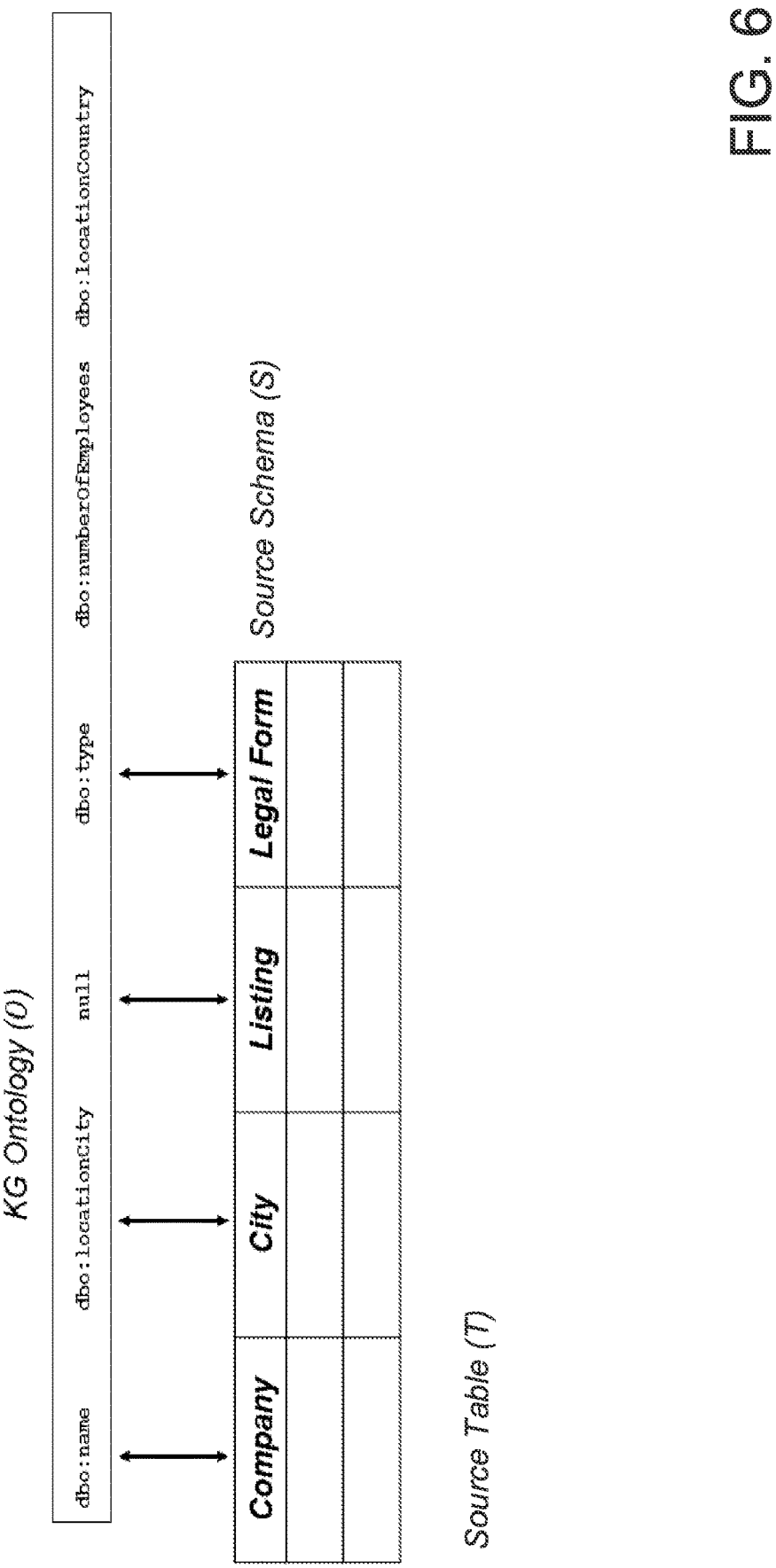
FIG. 6 is an example diagram illustrating a technique of matching a source schema defining attributes of data tuples to an ontology of a knowledge graph.

Example 7—Example Method of Matching Source Schema of a Source Table to Ontology of Knowledge Graph FIG. 6 illustrates an example method of schema matching operation which can match source schema associated with the source table (T) to the ontology (O) of the knowledge graph (KG). The schema matching operation can also access table content of interest (TC) and instances (I). The example schema matching operation described herein can be performed by the schema matching operator 130 described above.

As shown in FIG. 6, the source schema (S) associated with the source table (T) defines a plurality of attributes including "Company," "City," "Listing," and "Legal Form." The ontology (O) of the knowledge graph (KG) defines a plurality of properties for instances, including "dbo:name," "dbo:locationCity," "dbo:type," "dbo:numberOfEmployees," "dbo:locationCountry," etc. In the depicted example, three table attributes are matched to respective ontology properties to form three attribute-property pairs. For example, "Company" is matched to "dbo:name," "City" is matched to "dbo:locationCity," and "Legal Form" is matched to "dbo:type." Table property "Listing" is not matched to any of the ontology properties, thus the matching returns a null value for "Listing."

In certain examples, a match can be annotated as a two-element match tuple, e.g., (Company, dbo:name) The first element (e.g., Company) in the two-element match tuple can be a unique resource identifier (URI) defined in the source schema for the attribute "Company." The second element (e.g., dbo:name) in the two-element match tuple can be a URI of the property "dbo:name" defined in the ontology (O). In other words, when an attribute defined in the source schema is matched to a property defined in the ontology, the URI of the attribute (defined in the source schema) is aligned with the URI of the property (defined in the ontology). Such schema-matched or aligned attribute-property pair can be annotated by the two-element match tuple.

In certain examples, a 1:N match can be expressed through multiple two-element match tuples. This can occur, for example, when an attribute defined in the source schema can be matched to multiple properties defined in the ontology. For example, if the source table has a column with an attribute "Name" (e.g., for listing person's name), and the ontology of a knowledge graph defines two properties "abc:firstName" and "abc:lastName" for an instance representing a person, then a 1:2 match can occur as annotated by the following two match tuples: (Name, abc:firstName) and (Name, abc:lastName).

As described herein, the schema matching operation can be data set specific and can also differ among different knowledge graphs. This is because source schemas associated with different source tables can define attributes differently, and properties defined by different knowledge graphs can also vary.

In any of the examples described herein, the schema matching operation can be implemented in a number of ways. For example, the schema matching operation can be implemented by a simple string comparison. In certain examples, the string comparison can be based on approximate match, instead of requiring exact match. For example, a fuzzy string comparison technique can be used to determine if an attribute defined by a source schema matches a property defined by a knowledge graph. The fuzzy string comparison can determine two strings match each other if a similarity measure (e.g., Jaccard index) between the two strings exceeds a predefined threshold. As an example, the fuzzy string comparison may find "FirstName" matches "first_name" because both strings share a common pattern of partial words/characters. In certain examples, wildcards (e.g., '*', '%', etc.) can be used in string comparison. In certain examples, a synonym dictionary can be used to facilitate string comparison. More advanced string comparison techniques can also be utilized, for example, based on semantic analysis or the like.

Figure 7:
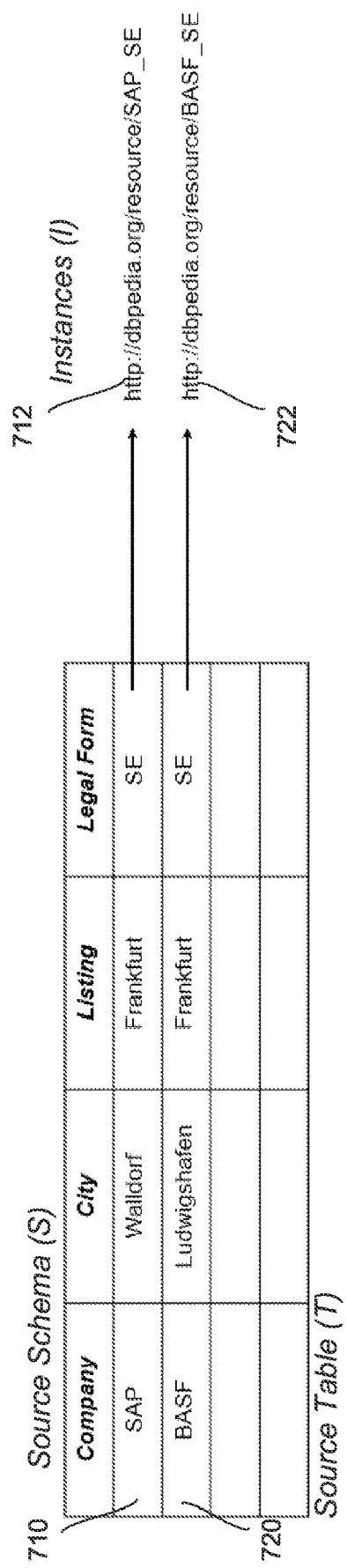
FIG. 7 is an example diagram illustrating a technique of linking data tuples to respective instances in the knowledge graph.

Example 8—Example Method of Linking Data Tuples to Respective Instances in Knowledge Graph FIG. 7 illustrates an example method of linking operation which can link data tuples in the source table (T) or table content of interest (TC) to respective instances (I) in the knowledge graph (KG). The example linking operation described herein can be implemented by the instance linking operator 132 described above.

In the depicted example, two example data tuples 710, 720 are shown in the source table (T): (SAP, Waldorf, Frankfurt, SE) and (BASF, Ludwigshafen, Frankfurt, SE). As described above, elements in these data tuples have corresponding attributes (i.e., "Company," "City," "Listing," and "Legal Form") which are defined in the source schema associated with the source table (T).

In the depicted example, the first data tuple 710 (SAP, Waldorf, Frankfurt, SE) is linked to an instance 712 in the knowledge graph (KG) representing the company SAP with a unique URI (e.g., http://dbpedia.org/resource/SAP_SE), and the second data tuple 720 (BASF, Ludwigshafen, Frankfurt, SE) is linked to another instance 722 in the knowledge graph (KG) representing the company BASF with another unique URI (e.g., http://dbpedia.org/resource/BASF).

In certain examples, the linking operation can utilize the results of schema matching operation (e.g., schema_alignment returned by the function match_schema) or any other available information. In certain examples, a data tuple can be found to link to a specific instance if attributes of the data tuple and the schema-matched properties of the instance share certain commonalities. For example, assume the instance 712 has the following properties: "dbo:name"=SAP; "dbo:locationCity"=Waldorf; and "dbo:type"=SE. Then the algorithm will find that the properties of the instance 712 are the same as (or at least similar to) the corresponding attributes (i.e., "Company," "City," and "Legal Form") in the data tuple 710. As a result, the data tuple 710 can be linked to the instance 712.

Similar to the schema matching operation, the linking operation can be data set specific and can also differ among different knowledge graphs. This is because source schemas associated with different source tables can define attributes differently, and properties defined by different knowledge graphs can also vary.

Also like the schema matching operation, the linking operation can be implemented in a number of ways. For example, the linking operation can be implemented by a simple value comparison. Specifically, values of the attributes (of a data tuple) can be compared to corresponding (i.e., schema-matched) values of the properties (of an instance) to determine if they match.

When the values are characters (e.g., name, labels, etc.), string comparison can be used. The string comparison can be based on exact match or approximate match, as described above. In certain examples, a synonym dictionary can be used to facilitate string comparison (e.g., an edge property in Wikidata knowledge graph can be associated with multiple synonyms). More advanced string comparison techniques (e.g., based on semantic analysis or the like) can also be utilized.

When the values are numeric (e.g., integers, floating points, etc.), numerical comparison can be applied. Similarly, the numerical comparison can be based on exact match, or approximate match (e.g., two values can be deemed to match if their difference is smaller than a predefined threshold).

When the values are expressed in date and/or time format, data and/or time comparison can be applied. For example, two dates can be deemed to match if they are identical, or if their difference is less than a predefined period (e.g., 5 days, 1 month, etc.).

In certain examples, more sophisticated entity linking approaches can be used. For example, besides comparing values (e.g., names or labels), the linking operation can be configured to evaluate overlap of attribute values, and a match can be annotated if the overlap of attribute values exceeds a predefined threshold. To illustrate, assume in one example the schema matching operation matches attributes "City" and "Legal Form" to respective properties "dbo:locationCity" and "dbo:type," but does not find a match for the property "dbo:name." For the first data tuple 710 (SAP, Waldorf, Frankfurt, SE), the linking operator can look for entries in the knowledge graph that satisfy the following Boolean conditions: (1) the property value of "dbo:locationCity" equals "Walldorf"; AND (2) the property value of "dbo:type" equals "SE." In other words, the linking operator can look for overlap of attribute values for two schema matched properties: "City" and "Legal Form." If multiple entries are found to have overlapping values, the linking operator can calculate a statistical overlap or similarity measure such as Jaccard index with the matching values and pick the top-ranked entry if calculated similarity measure is above a pre-defined threshold.

In certain examples, a data tuple can be found to link to a specific instance if matches are determined for all schema-matched attribute-property pairs. For example, in the depicted example, there are three schema-matched attribute-property pairs: "Company"—"dbo:name," "City"—"dbo:locationCity," and "Legal Form"—"dbo:type." The linking operation can link a data tuple to an instance if matching is determined for all three schema-matched attribute-property pairs.

In other examples, a data tuple can be found to link to a specific instance if matches are determined for a majority of schema-matched attribute-property pairs (or alternatively, the number of matches exceeds a predefined percentage of the total number of schema-matched attribute-property pairs). For example, assume the instance 712 has the following properties: "dbo:name"=SAP; "dbo:locationCity"=Waldorf; and "dbo:type"=Unknown. Although matches are found in two schema-matched attribute-property pairs (i.e., "Company"—"dbo:name" and "City"—"dbo:locationCity"), values do not match between "Legal Form" (e.g., SE) and "dbo:type" (e.g., Unknown). However, the linking operation can still link the data tuple 710 to the instance 712 if the algorithm only requires matching for a majority of schema-matched attribute-property pairs (e.g., matches are found in 2 out of 3 schema-matched attribute-property pairs).

In certain examples, the results of the linking operation can include a list of two-element link tuples corresponding to the data tuples in the source table (or table content of interest). The first element in a two-element link tuple can be a URI defined in the source schema referring to a specific data tuple (e.g., 710 or 720). The second element in the two-element link tuple can be the URI of the instance (e.g., 712 or 722) defined in the ontology of the knowledge graph.

Example 9—Example Method of Mapping Data Tuples to Tuple Lists

Figure 8:
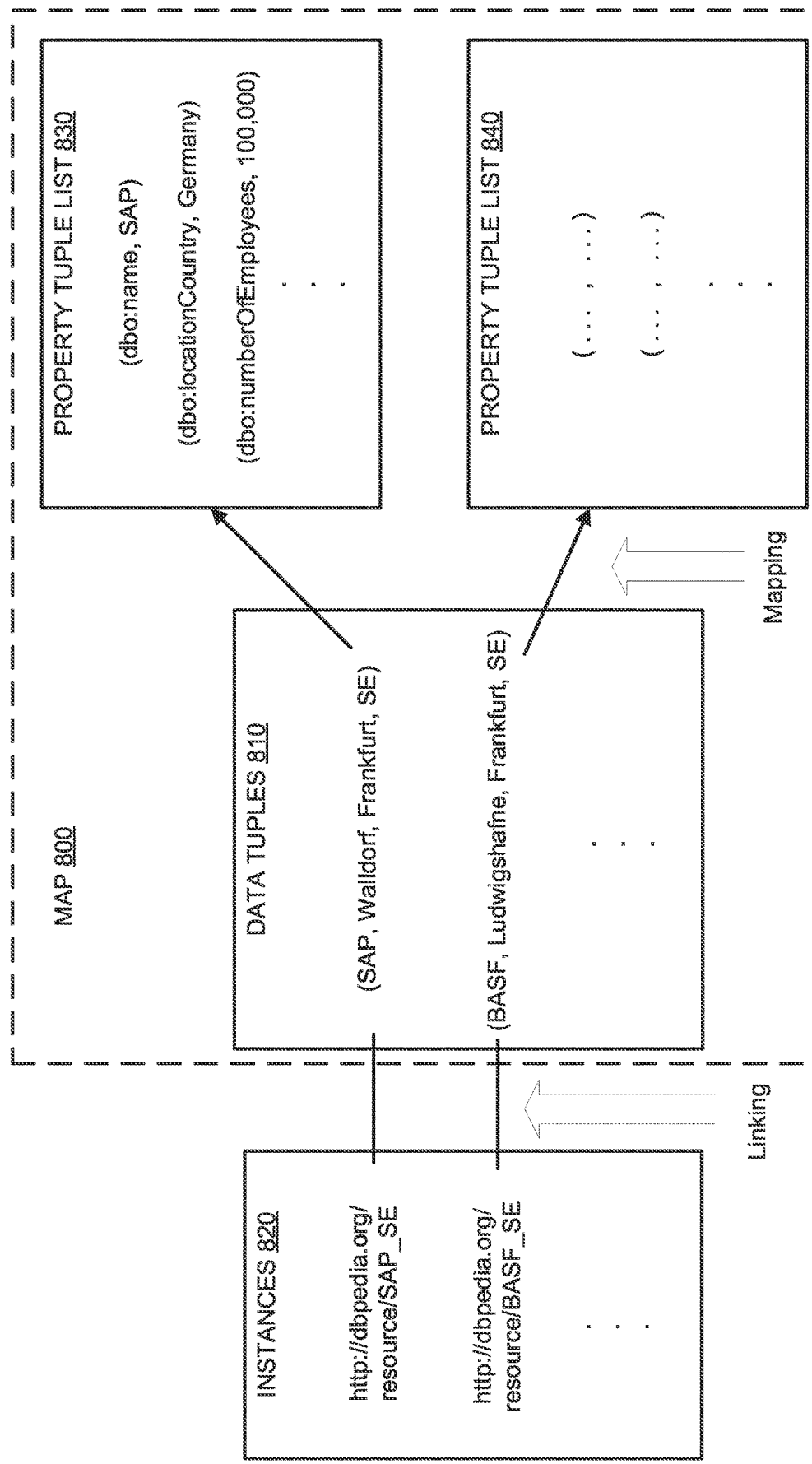
FIG. 8 is an example diagram illustrating a technique of identifying non-matching properties of instances and obtaining property values associated with the non-matching properties from the knowledge graph.

After the linking operation, a mapping operation can map the data tuples in the source table (e.g., T) or table content of interest (e.g., TC) to respective property tuple lists, as illustrated in FIG. 8.

As shown in FIG. 8 and described above, the linking operation can link data tuples 810 to respective instances 820 in the knowledge graph. Because each instance 820 can have a plurality of properties and corresponding property values, each data tuple 810 can then be mapped to a linked instance's properties and property values. For example, the data tuple (SAP, Waldorf, Frankfurt, SE) is linked to the instance representing company SAP (URI http://dbpedia.org/resource/SAP_SE), which has the following property and property value pairs: "dbo:name"="SAP," "dbo:locationCountry"="Germany," "dbo:numberofEmployees"=100,000, etc. Thus, the data tuple (SAP, Waldorf, Frankfurt, SE) can be mapped to a property tuple list 830 which includes a list of two-element property tuples corresponding to different properties of the instance linked to the data tuple, wherein the first element in a property tuple can be the URI of a property and the second element in the property tuple can be the corresponding value of the property. For example, in the depicted example, the data tuple (SAP, Waldorf, Frankfurt, SE) is mapped to the property tuple list 830 including the following property tuples: (dbo:name, SAP), (dbo:locationCountry, Germany), (dbo:numberOfEmployees, 100,000), etc. Similarly, after linking the data tuple (BASF, Ludwigshafen, Frankfurt, SE) to the instance representing company BASF (URI http://dbpedia.org/resource/BASF), the data tuple (BASF, Ludwigshafen, Frankfurt, SE) can be mapped to another property tuple list 840 associated with the instance representing BASF.

Thus, the mapping operation described above can create a map 800 which maps the data tuples 810 to respective property tuple lists (e.g., 830, 840, etc.). Thus, each data tuple in the map, which has a unique URI defined in the source schema, can be a key pointing to a unique data structure, i.e., property tuple list.

Figure 9:
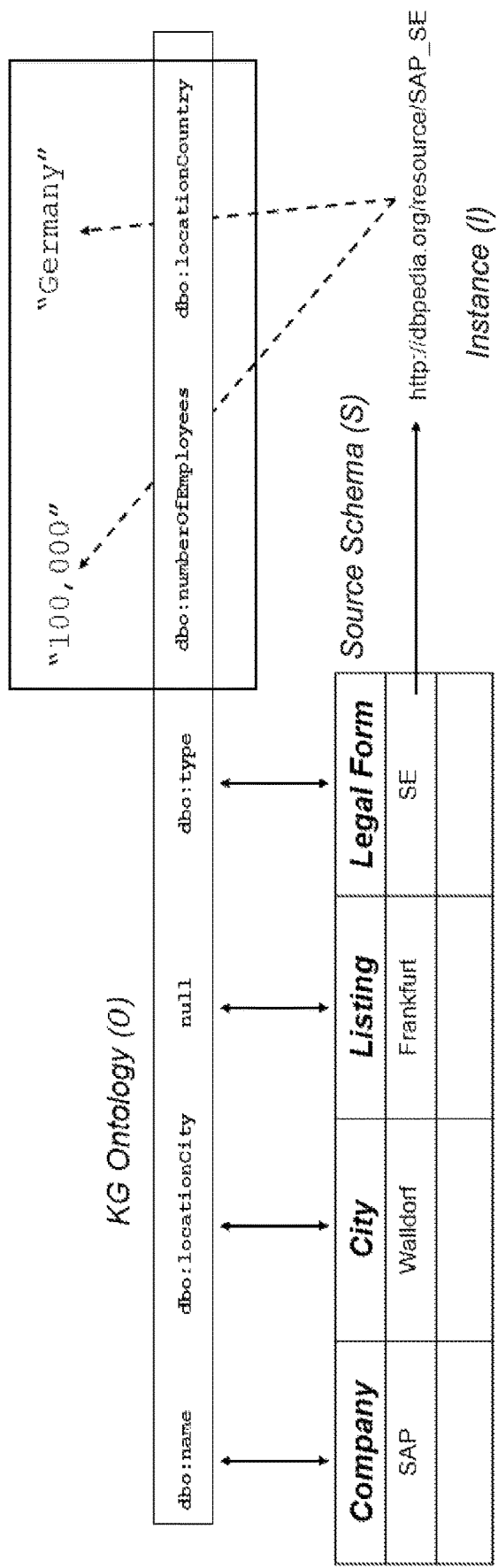
FIG. 9 is an example diagram illustrating a technique of mapping data tuples to tuple lists.

Example 10—Example Method of Identifying Non-Matching Properties and Obtaining Associated Property Values FIG. 9 illustrates an example method of searching operation to identify non-matching properties and obtain associated property values. The example method of searching operation described herein can be performed by the by the new property finder 134 and property value retriever 136 described above.

After schema matching and linking operations, non-matching properties can be identified by a searching operation (e.g., via the new property finder 134) and their associated properties values can be derived (e.g., via the property value retriever 136). As described herein, non-matching properties are properties defined in the ontology of the knowledge graph but are not matched to the source schema. In other words, non-matching properties refer to properties of the linked instances that are not present in the source schema.

For example, as shown in FIG. 9, the ontology (O) of the knowledge graph (KG) have at least two non-matching properties, i.e., "dbo:numberOfEmployees" and "dbo:locationCountry" that are not matched to any attributes defined in the source schema (S) associated with the source table (T). The property values associated with these non-matching properties are respectively "100,000" and "Germany" As described below, the non-matching properties can be represented by semantically meaningful labels (e.g., "Employees" and "Country") when adding them to the source table (T).

In certain examples, the non-matching properties associated with the linked instances can be found by searching respective property tuple lists mapped to the instances. For example, for data tuples 810 depicted in FIG. 8, by searching the property tuple list 830, the both "dbo:numberOfEmployees" and "dbo:locationCountry" can be found as non-matching properties, whereas "dbo:name" is not because it is schema-matched to attribute "Company."

Example 11—Example Method of Enriching Source Tables

As described herein, a source table can be enriched by an inserting operation which can add one or more of the non-matching properties and the associated property values to respective data tuples of the source table. The example inserting operation described herein can be performed by the inserter 124 described above.

For example, in the example shown in FIG. 9, the source table (T) can be enriched by adding the non-matching property "dbo:numberOfEmployees" and its associated property value "100,000," or adding the non-matching property "dbo:locationCountry" and its associated property value "Germany," or both, to the source table. In certain examples, the inserting operation can append the non-matching properties and the associated property values to the end (e.g., after the last column) of the source table. In certain examples, the inserting operation can add the non-matching properties and the associated property values between existing columns of the source table.

In certain examples, the non-matching properties and the associated property values can be presented to a user through a graphic user interface (e.g., 122). The user can select which non-matching properties should be used to added to the source table.

In certain examples, semantically meaningful labels corresponding to the non-matching properties can be used when adding to the source table. In certain examples, labels corresponding to the non-matching properties are defined in the knowledge graph. In certain examples, a user can provide or edit a label for a non-matching property. For example, instead of using the label "locationCountry" defined in the knowledge graph, the user can change the label to "Country." As described herein, such labels can be referred to as non-matching property labels.

In certain examples, a non-matching property of an instance linked to a data tuple of a source table may not have associated property value (i.e., the property value for that non-matching property has not been annotated in the knowledge graph). In such circumstances, a null value (e.g., NULL) can be assigned to the data tuple if the non-matching property is selected to enrich the source table. In other words, if the non-matching property is added to the source table (e.g., as a new column), then its corresponding property value can be set to NULL (or empty) in the data tuple.

In certain examples, the linking operation described above may fail to find an instance linked to a specific data tuple of a source table (e.g., a data tuple representing a small and/or new company may not have a corresponding instance included in a knowledge graph). In such circumstances, if a non-matching property (linked to another data tuple) is selected to enrich the source table, then a null value (corresponding to the non-matching property) can be assigned to the data tuple that has no linked instance in the knowledge graph.

In certain examples, after selected non-matching properties have been added to the source table, the source schema associated with the source table can be updated to record the non-matching properties added to the source table. For example, if the non-matching property "dbo:locationCountry" has been added to the source table (T), a new attribute "Country" can be added to the source schema (S) if "Country" is the label when adding the non-matching property "dbo:locationCountry" to the source table (T).

In certain examples, after selected non-matching properties and the associated property values have been added to respective data tuples of the source table, relevant data linkage information pertaining to the data enrichment can be logged into a log file. Such logging operation can be performed, e.g., by the data logger 126 described above. The logged data linkage information can include, but is not limited to: who (e.g., name and user identifier) performed the data enrichment operation, which source table(s) have been enriched, which data tuples (or table content of interest) has been enriched, which non-matching properties have been added to respective data tuples of the source table, which knowledge graph(s) have been used for the data enrichment, what ranking criteria have been used to rank the non-matching properties, the date and time (e.g., timestamps) when the non-matching properties have been added to the source table, and/or the like.

In certain examples, such logged data linkage information can facilitate ranking of non-matching properties, as described below. In certain examples, such logged data linkage information can be important for regulatory compliance, e.g., to trace data source imported into a source table from an external database. In certain examples, such logged data linkage information can be helpful to evaluate data quality in a source table. For example, original data (i.e., internal data before data enrichment) in a source table may be deemed more trustworthy than data imported (i.e., added during data enrichment) from a knowledge base. In another example, data imported from one knowledge graph (e.g., a public/free knowledge graph or a knowledge graph that has not been updated for a long period of time) may be deemed to have less quality than another knowledge graph (e.g., a private/proprietary knowledge graph that has been up to date).

Example 12—Example Method of Ranking Non-Matching Properties

In certain examples, when the non-matching properties and the associated property values are presented to a user for selection, those non-matching properties can be displayed to the user in a ranked order or ranked list. In other words, the intelligent data enrichment algorithm can recommend which non-matching properties (e.g., those ranked higher in the ranked order) are used to enrich the source table. The example ranking operation described herein can be performed by a ranking operator (e.g., 128), which can use different heuristics and/or criteria to rank the non-matching properties.

In one example, among all non-matching properties that are candidates for enriching a source table, the most "popular" property can be ranked highest in the ranked order. Specifically, the most "popular" property can be determined by counting instances in the knowledge graph having property values associated with (or annotated for) the non-matching properties. As an example, in the DBpedia knowledge graph, the most "popular" property can be determined as the most often used property for the rdf:type of matched instances. For example, property about employees ("dbo:numberOfEmployees") would be ranked first if the property is more often used than the property about Country ("dbo: locationCountry") for type "dbo:Organization." This can be determined, for example, using SPARQL queries as shown in the following table:

SELECT (count(?p as ?count)) WHERE {
  ?c rdf:type dbo:Organisation.
  ?c ?p ?o.
  FILTER(?p=dbo:numberOfEmployees)
}
LIMIT 100

In the above example, the queries can find out in the knowledge graph, how many companies have the property "numberofEmployees" annotated (i.e., with associated property values) and how many have the property "locationCountry" annotated (i.e., with associated property values). The property that has been annotated more can be deemed more "popular" and thus ranked higher.

In another example, ranking of the non-matching properties can be based on previously logged data linkage information. For example, if one analyst enriched a source table "Business Customer" with a non-matching property "numberOfEmployees," the analyst's action can be recorded in a log file as described above. When another analyst works on this or another similar source table, it could be derived from such logged information that this property may be a semantically meaningful column because someone else has already "adopted" it for data enrichment. As such, the ranking operator (e.g., 128) can rank the previously "adopted" non-matching property higher than others.

In yet another example, ranking of the non-matching properties can be based on minimizing the total number of null values assigned to a data tuple of a source table. As noted above, a null value can be assigned to a data tuple of the source table if a corresponding non-matching property of the respective instance linked to the data tuple has no associated property value or if the data tuple is not linked to a respective instance in the knowledge graph. One purpose of enriching the source table is to supplement it with new properties with associated property values. Thus, if the data tuples in the source table have been added a new property but most of the property values corresponding to the new property are null values, then there is no meaningful data enrichment for the source table. Thus, the ranking operator (e.g., 128) can be configured to rank the non-matching properties based on the number of null values would present in the data tuples had the non-matching properties been selected for enriching the source table, e.g., a non-matching property that would result in less null values in the data tuples can be ranked higher than another non-matching property that would result in more null values in the data tuples.

Example 13—Example Intelligent Data Enrichment Using Multiple Knowledge Graphs In certain examples, the intelligent data enrichment algorithm described herein can simultaneously use multiple knowledge graphs to supplement data to a source table. For example, to enrich data tuples in a source table, certain non-matching properties and associated property values can be added from one knowledge graph (e.g., Wikidata), whereas certain non-matching properties and associated property values can be added from another knowledge graph (e.g., DBpedia).

In certain examples, when a non-matching property is recommended by two or more knowledge graphs, a decision can be made on which knowledge graph is used to provide the property value for the non-matching property. In some circumstances, such decision can be made by a user, for example, based on the user's knowledge and/or judgement about the appropriateness of the property values. In some circumstances, such decision can be made automatically, for example, based on certain heuristics and/or predefined rules (e.g., defining about which knowledge base is more trustworthy and/or has higher quality).

Example 14—Example Graphical User Interfaces

FIGS. 10-13 show example graphical user interfaces illustrating application of the technology described herein for intelligent data enrichment. It is to be understood that the graphical user interfaces described herein merely illustrate an example implementation of the user interface 122 and should not be construed to be limiting.

Figure 10:
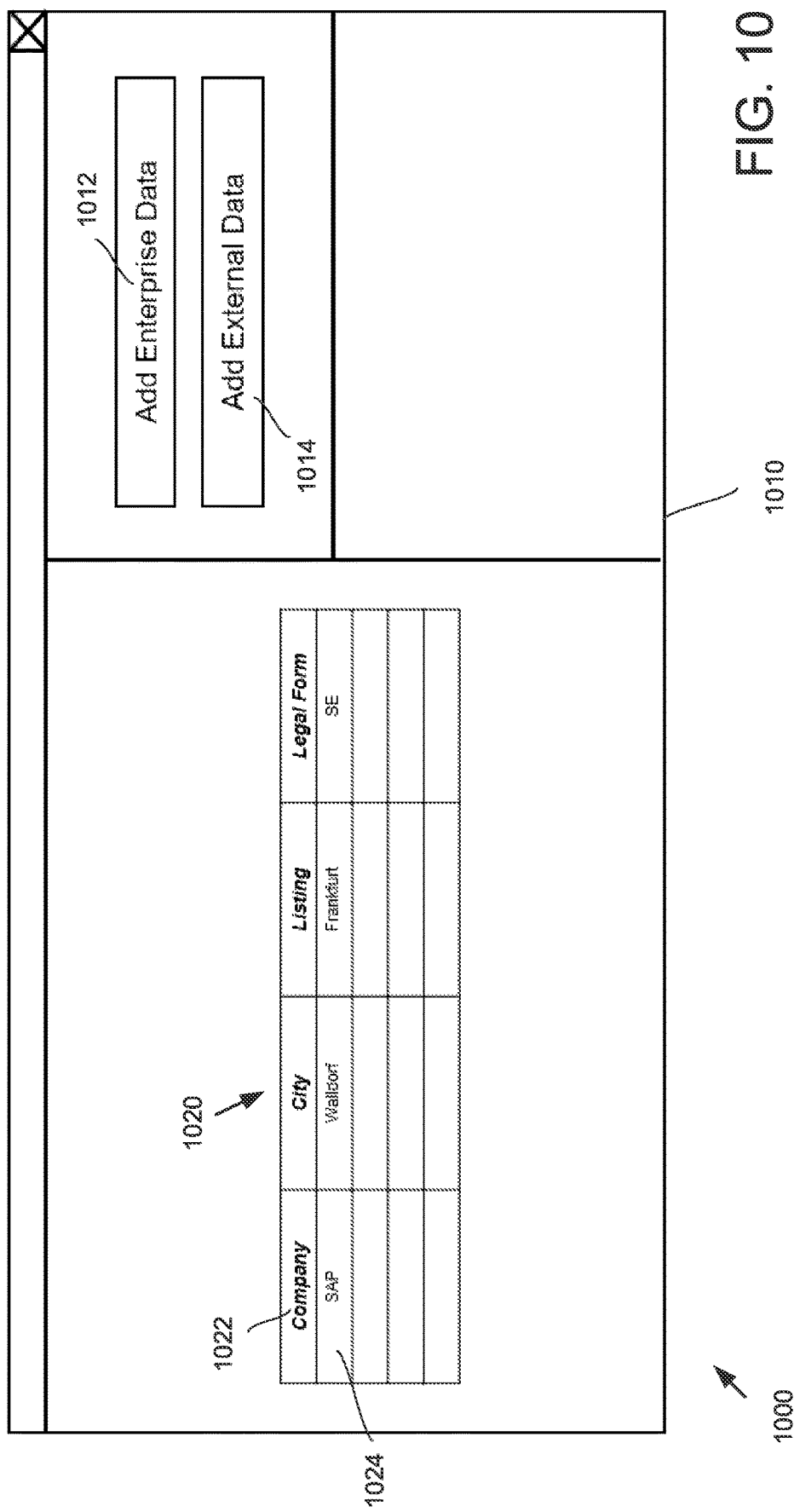
FIG. 10 is an example graphical user interface showing a source table having one data tuple and controls for data enrichment.

FIG. 10 shows a graphical user interface 1000 including a window 1010 that displays a source table 1020. In some examples, only a portion of a source table 1020, e.g., a table content of interest, is displayed in a left panel of the window 1010. The source table 1020 has a source schema 1022 defining a plurality of attributes including: "Company," "City," "Listing," and "Legal Form." A data tuple (SAP, Waldorf, Frankfurt, SE) 1024 is also shown in the first row of the source table 1020. The graphical user interface 1000 can also provide options for a user to select sources from which the source table 1020 can receive additional data to enrich the source table 1020. For example, two controls 1012, 1014 (e.g., buttons) can be added to a top-right panel of the window 1010: selecting the control 1012 can allow the user to add enterprise data (i.e., internal data) to the source table 1020, whereas selecting the control 1014 can allow the user to enrich the source table 1020 from external data sources, such as one or more knowledge graphs, as described above.

Figure 11:
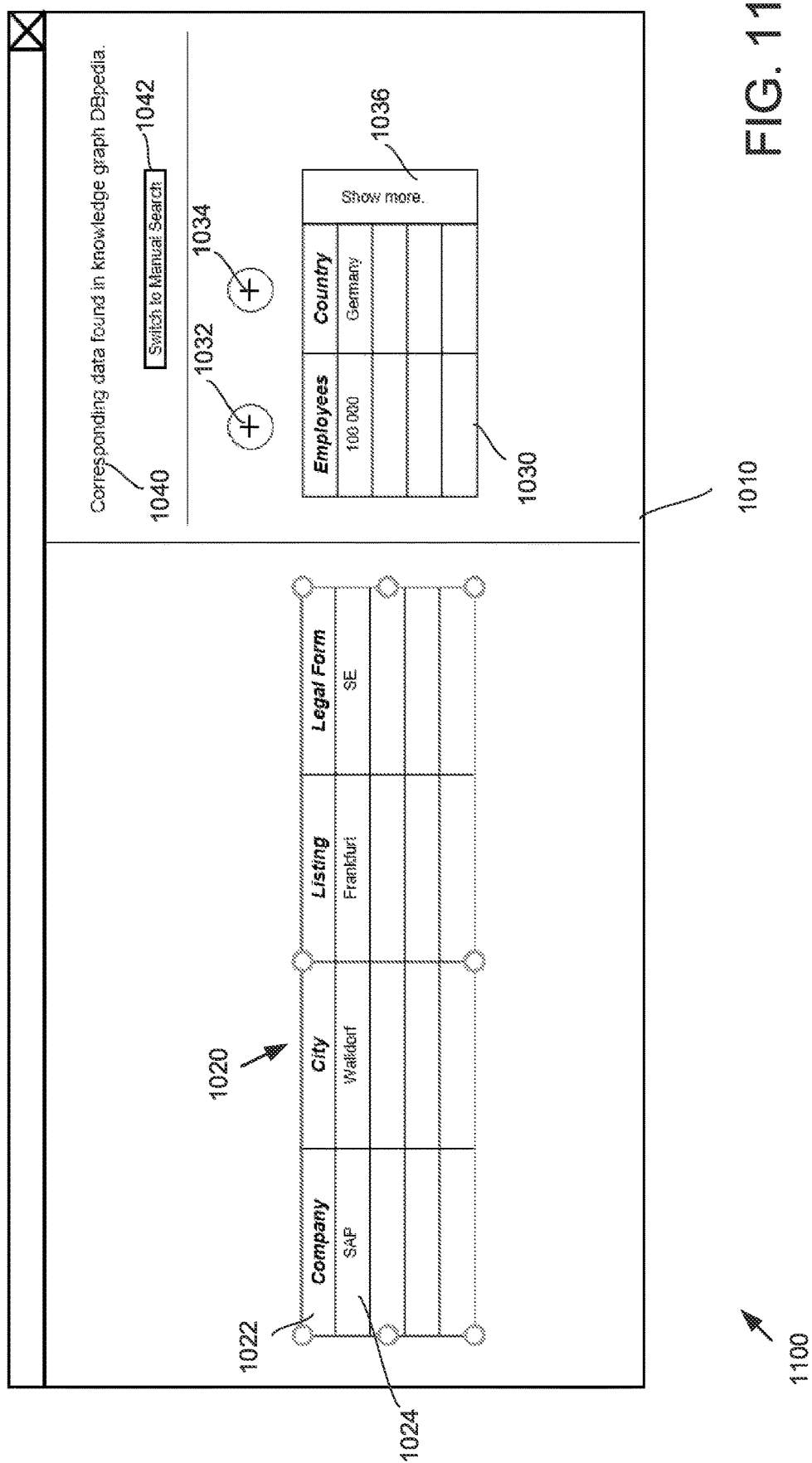
FIG. 11 is an example graphical user interface showing the source table of FIG. 10 together with new properties and property values recommended to be added to the data tuple after running the intelligent data enrichment algorithm using DBpedia.

FIG. 11 shows the example graphical user interface 1100 after the user chooses to add external data, e.g., by selecting the control 1014. In the depicted example, the external data source is DBpedia knowledge graph. After running the intelligent data enrichment algorithm described above, a message 1040 can be displayed on the top-right panel to indicate the status of data enrichment, e.g., "Corresponding data found in knowledge graph DBpedia." Optionally, a control 1042 (e.g., button) can be provided to allow the user to switch to manual search of the external data source.

As shown in FIG. 11, a recommendation table 1030 can be provided in a bottom-right panel of the window 1010. The recommendation table 1030 can display a plurality of the non-matching property labels (e.g., "Employees" and "Country") identified from the knowledge graph, as well as the respective property values (e.g., "100,000" and "Germany") corresponding to the data tuple 1024. As noted above, the non-matching properties can be ranked and only the top-ranked non-matching properties and their associated property values are displayed in the recommendation table 1030. In the depicted example, the recommendation table 1030 can have an expansion control 1036, the selection of which can cause the recommendation table 1030 to show labels for additional non-matching properties and associated property values.

Figure 12:
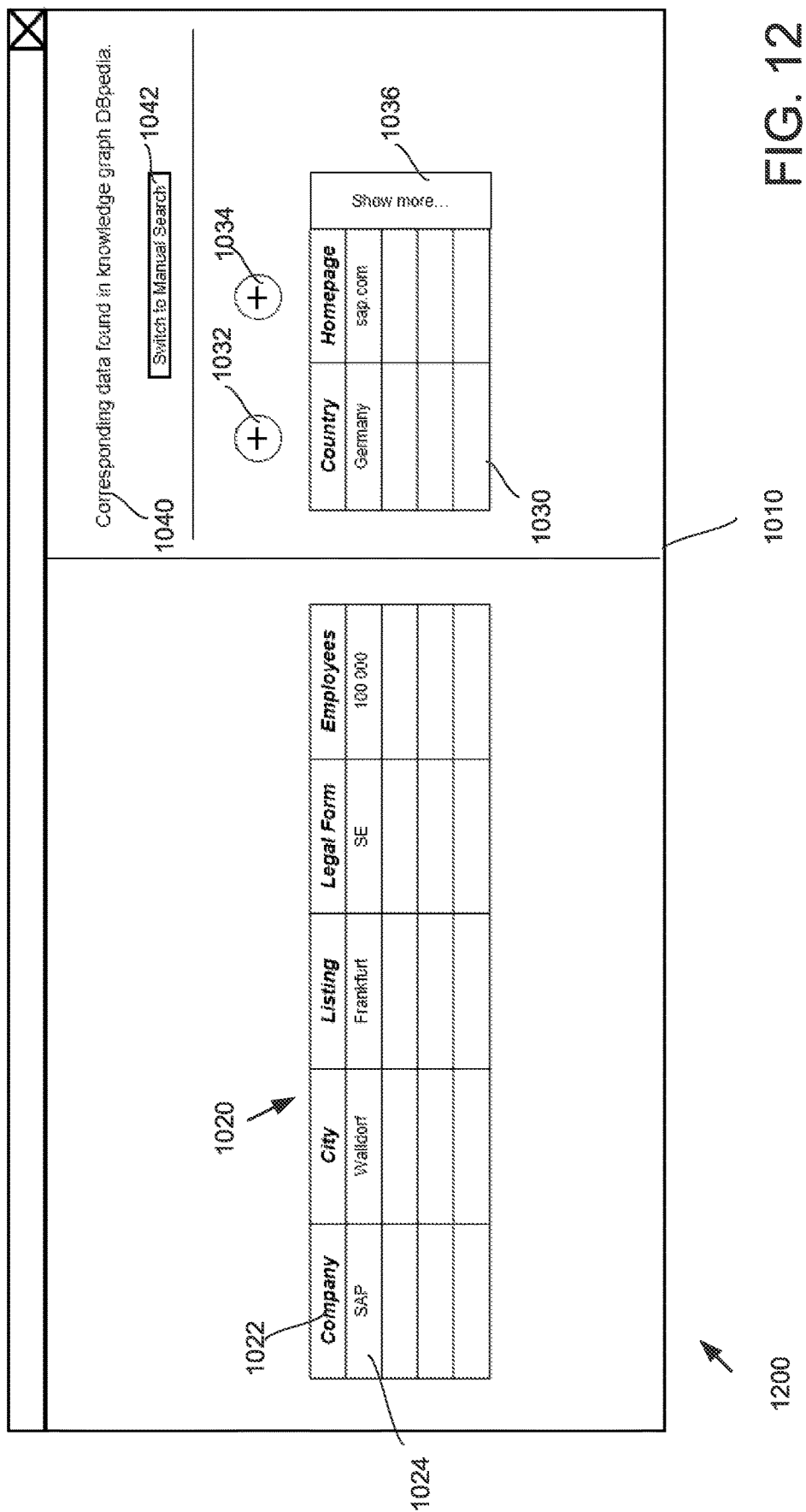
FIG. 12 is an example graphical user interface showing an enriched source table where a new property and the associated property value are added to the data tuple.

In addition, controls 1032, 1034 associated with the displayed non-matching properties can be placed adjacent to respective non-matching property labels. Selection of the controls 1032, 1034 can cause corresponding non-matching property labels and the associated property values to be added to the source table 1020. As an example, the graphic user interface 1200 depicted in FIG. 12 shows the result after a user selects the control 1032. As shown, the non-matching property label "Employees" and the associated property value "100,000" have been added to the data tuple 1024 to create a new column. Meanwhile, the display in the recommendation table 1030 has been updated by removing the "Employees" column and adding a new column showing a non-matching property label "Homepage" and the associated property value "sap.com."

Figure 13:
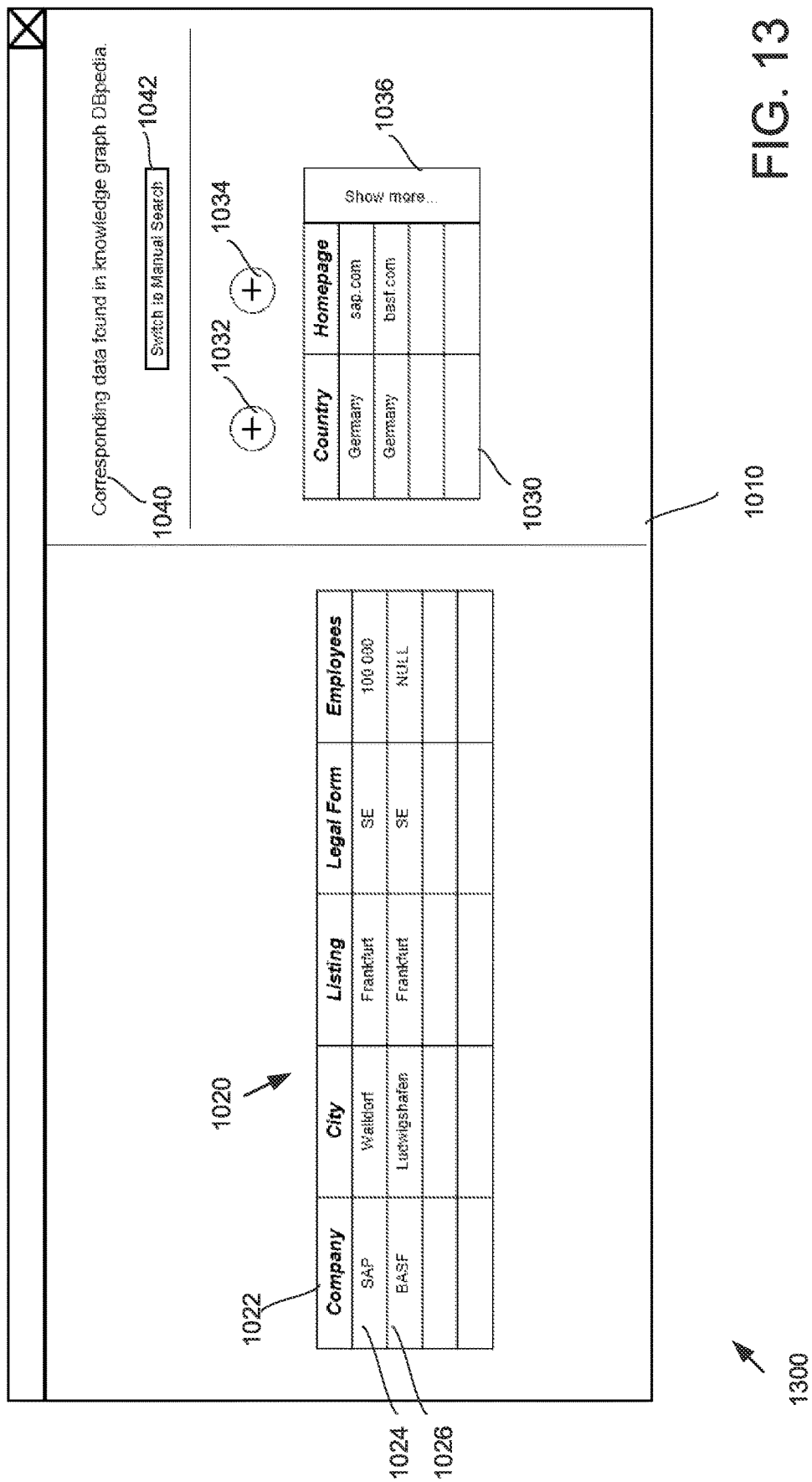
FIG. 13 is an example graphical user interface showing an enriched source table having two data tuples.

FIG. 13 shows another example graphical user interface 1300 where the source table 1020 displays two data tuples: (SAP, Waldorf, Frankfurt, SE) 1024 and (BASF, Ludwigshafen, Frankfurt, SE) 1026, and after the source table 1020 has been enriched by adding a new column "Employees." As shown, the property value added to the data tuple 1024 is "100,000," whereas the property value added to the data tuple 1026 is NULL. As noted above, the null value can be assigned to the data tuple 1026 if the corresponding non-matching property (e.g., "Employees") has no associated property value or if the data tuple 1026 has no linked instance in the knowledge graph.

Example 15—Example Advantages

A number of advantages can be achieved via the technology described herein. For example, the intelligent data enrichment system and method described herein can support automatic searching external data sources to find relevant data that supplements internal data and provide an efficient means to import the relevant external data to the enterprise's analytics environment. Besides initial user input, e.g., selection of source table to be enriched, the intelligent data enrichment algorithm can search external knowledge graphs and recommend data (which can be ranked in terms of importance or value) for data enrichment. The user can select from the recommended data, e.g., through simple clicks, to add to the source table. The described intelligent data enrichment system can also log relevant data enrichment information to facilitate future data enrichment, improve data quality control, and/or support regulatory compliance of data integrity.

Example 16—Example Computing Systems

Figure 14:
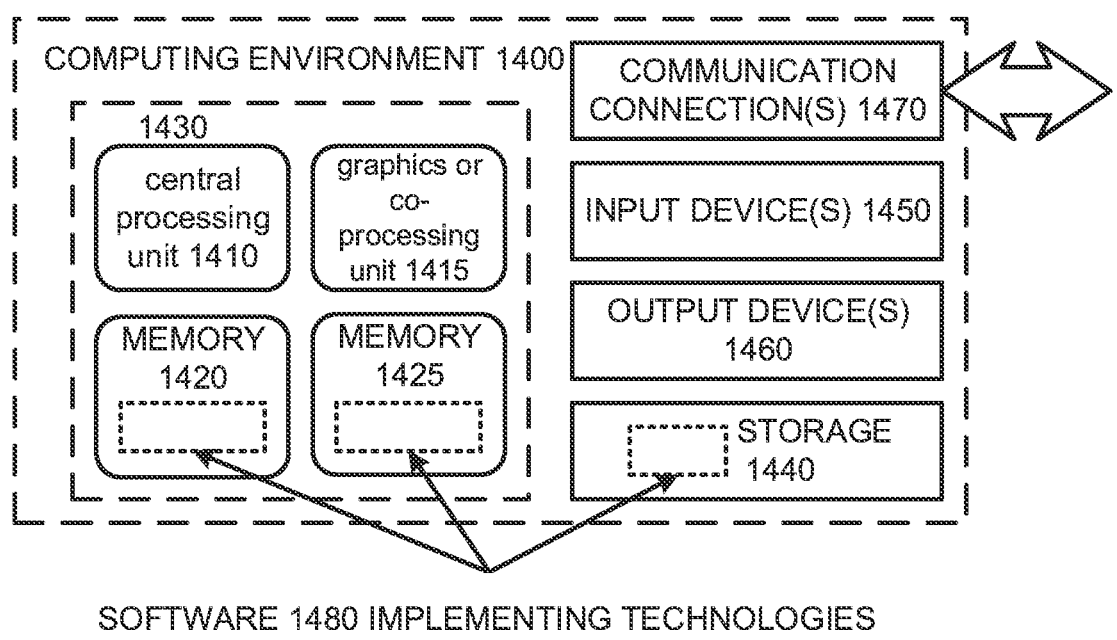
FIG. 14 is a block diagram of an example computing system in which described embodiments can be implemented.

FIG. 14 depicts an example of a suitable computing system 1400 in which the described innovations can be implemented. The computing system 1400 is not intended to suggest any limitation as to scope of use or functionality of the present disclosure, as the innovations can be implemented in diverse computing systems.

With reference to FIG. 14, the computing system 1400 includes one or more processing units 1410, 1415 and memory 1420, 1425. In FIG. 14, this basic configuration 1430 is included within a dashed line. The processing units 1410, 1415 execute computer-executable instructions, such as for implementing the features described in the examples herein. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 14 shows a central processing unit 1410 as well as a graphics processing unit or co-processing unit 1415. The tangible memory 1420, 1425 can be volatile memory (e.g., registers, cache, RAM), non-volatile memory (e.g., ROM, EEPROM, flash memory, etc.), or some combination of the two, accessible by the processing unit(s) 1410, 1415. The memory 1420, 1425 stores software 1480 implementing one or more innovations described herein, in the form of computer-executable instructions suitable for execution by the processing unit(s) 1410, 1415.

A computing system 1400 can have additional features. For example, the computing system 1400 includes storage 1440, one or more input devices 1450, one or more output devices 1460, and one or more communication connections 1470, including input devices, output devices, and communication connections for interacting with a user. An interconnection mechanism (not shown) such as a bus, controller, or network interconnects the components of the computing system 1400. Typically, operating system software (not shown) provides an operating environment for other software executing in the computing system 1400, and coordinates activities of the components of the computing system 1400.

The tangible storage 1440 can be removable or non-removable, and includes magnetic disks, magnetic tapes or cassettes, CD-ROMs, DVDs, or any other medium which can be used to store information in a non-transitory way and which can be accessed within the computing system 1400. The storage 1440 stores instructions for the software implementing one or more innovations described herein.

The input device(s) 1450 can be an input device such as a keyboard, mouse, pen, or trackball, a voice input device, a scanning device, touch device (e.g., touchpad, display, or the like) or another device that provides input to the computing system 1400. The output device(s) 1460 can be a display, printer, speaker, CD-writer, or another device that provides output from the computing system 1400.

The communication connection(s) 1470 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer, and should not be confused with acts performed by a human being. The actual computer operations corresponding to these terms vary depending on implementation.

Example 17—Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

Example 18—Example Cloud Computing Environment

Figure 15:
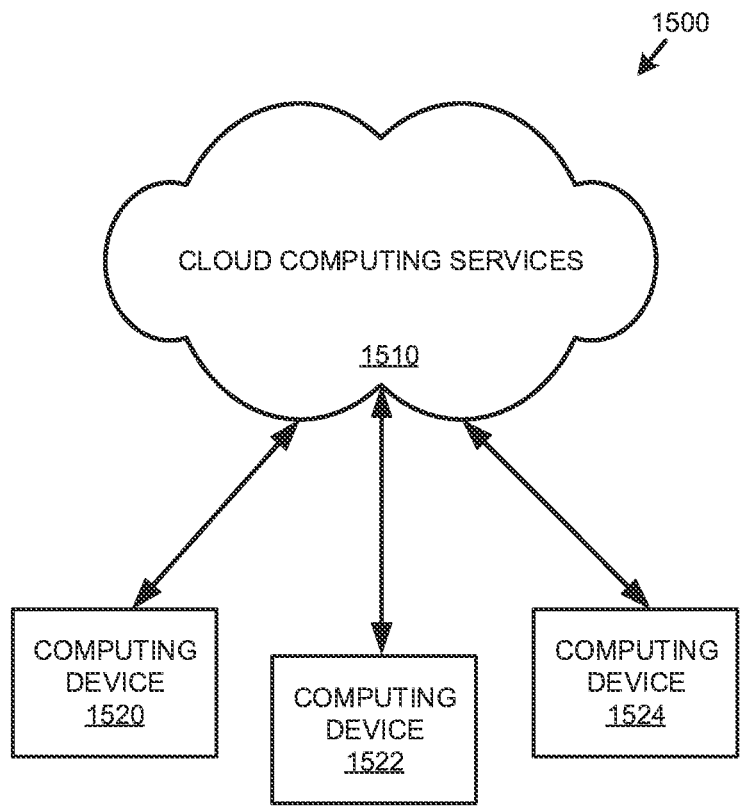
FIG. 15 is a block diagram of an example cloud computing environment that can be used in conjunction with the technologies described herein.

FIG. 15 depicts an example cloud computing environment 1500 in which the described technologies can be implemented, including, e.g., the system disclosed above and other systems herein. The cloud computing environment 1500 comprises cloud computing services 1510. The cloud computing services 1510 can comprise various types of cloud computing resources, such as computer servers, data storage repositories, networking resources, etc. The cloud computing services 1510 can be centrally located (e.g., provided by a data center of a business or organization) or distributed (e.g., provided by various computing resources located at different locations, such as different data centers and/or located in different cities or countries).

The cloud computing services 1510 are utilized by various types of computing devices (e.g., client computing devices), such as computing devices 1520, 1522, and 1523. For example, the computing devices (e.g., 1520, 151122, and 1524) can be computers (e.g., desktop or laptop computers), mobile devices (e.g., tablet computers or smart phones), or other types of computing devices. For example, the computing devices (e.g., 1520, 1522, and 1524) can utilize the cloud computing services 1510 to perform computing operations (e.g., data processing, data storage, and the like).

In practice, cloud-based, on-premises-based, or hybrid scenarios can be supported.

Example 19—Example Implementations

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

Example 20—Example Embodiments

Any of the following embodiments can be implemented.

Clause 1. A computer-implemented method comprising: receiving a source table containing data tuples and a source schema defining attributes of the data tuples; matching the source schema to an ontology of a knowledge graph, wherein the knowledge graph comprises a plurality of instances and the ontology defines properties of the plurality of instances; linking the data tuples to respective instances in the knowledge graph; identifying non-matching properties of the respective instances, wherein the non-matching properties are defined in the ontology and not matched to the source schema; obtaining property values associated with the non-matching properties from the knowledge graph; and adding one or more of the non-matching properties and the associated property values to respective data tuples of the source table.

Clause 2. The method of clause 1, further comprising creating a ranked list of non-matching properties and the associated property values, wherein the creating comprises ranking the non-matching properties of the respective instances.

Clause 3. The method of clause 2, further comprising presenting the ranked list of non-matching properties and the associated property values on a user interface, and receiving an input from the user interface indicating which non-matching properties and the associated properties values are added to respective data tuples of the source table.

Clause 4. The method of any one of clauses 2-3, wherein ranking the non-matching properties of the respective instances comprises counting instances in the knowledge graph having property values associated with the non-matching properties.

Clause 5. The method of any one of clauses 1-4, further comprising logging data linkage information, wherein the data linkage information records at least which non-matching properties have been added to respective data tuples of the source table.

Clause 6. The method of clause 5, further comprising ranking the non-matching properties of the respective instances based on previously logged data linkage information.

Clause 7. The method of any one of clauses 1-6, further comprising assigning a null value to a data tuple of the source table if a corresponding non-matching property of the respective instance linked to the data tuple has no associated property value or if the data tuple is not linked to a respective instance in the knowledge graph.

Clause 8. The method of clause 7, further comprising ranking the non-matching properties of the respective instances based on minimizing a total number of null values assigned to the data tuple of the source table.

Clause 9. The method of any one of clauses 1-8, further comprising mapping the data tuples to respective property tuple lists, wherein a property tuple list corresponds to a respective instance linked to the data tuple and comprises one or more pairs of non-matching property and property value associated with the non-matching property.

Clause 10. The method of any one of clauses 1-9, wherein the knowledge graph is one of a plurality of knowledge graphs, wherein the method further comprises identifying non-matching properties and obtaining property values associated with the non-matching properties from the plurality of knowledge graphs.

Clause 11. A system comprising: one or more processors; and memory coupled to the one or more processors comprising instructions causing the one or more processors implementing a table enrichment engine, wherein the table enrichment engine comprises: a user interface configured to receive a source table containing data tuples and a source schema defining attributes of the data tuples; a schema matching operator configured to match the source schema to an ontology of a knowledge graph, wherein the knowledge graph comprises a plurality of instances and the ontology defines properties of the plurality of instances; an instance linking operator configured to link the data tuples to respective instances in the knowledge graph; a new property finder configured to identify non-matching properties of the respective instances, wherein the non-matching properties are defined in the ontology and not matched to the source schema; a property value retriever configured to obtain property values associated with the non-matching properties from the knowledge graph; and an inserter configured to add one or more of the non-matching properties and the associated property values to respective data tuples of the source table.

Clause 12. The system of clause 11, wherein the table enrichment engine further comprises a ranking operator configured to rank the non-matching properties of the respective instances so as to create a ranked list of non-matching properties and the associated property values.

Clause 13. The system of clause 12, wherein the user interface is configured to present the ranked list of non-matching properties and the associated property values to a user, and receive an input from the user indicating which non-matching properties and the associated property values are added to respective data tuples of the source table.

Clause 14. The system of any one of clauses 12-13, wherein the ranking operator is configured to rank the non-matching properties of the respective instances based on counting instances in the knowledge graph having property values associated with the non-matching properties.

Clause 15. The system of any one of clauses 12-14, wherein the table enrichment engine further comprises a data logger configured to log data linkage information, wherein the data linkage information records at least which non-matching properties have been added to respective data tuples of the source table.

Clause 16. The system of clause 15, wherein the ranking operator is configured to rank the non-matching properties of the respective instances based on previously logged data linkage information.

Clause 17. The system of any one of clauses 12-16, wherein the inserter is configured to assign a null value to a data tuple of the source table if a corresponding non-matching property of the respective instance linked to the data tuple has no associated property value or if the data tuple is not linked to a respective instance in the knowledge graph.

Clause 18. The system of clause 17, wherein the ranking operator is configured to rank the non-matching properties of the respective instances based on minimizing a total number of null values assigned to the data tuple of the source table.

Clause 19. The system of any one of clauses 11-18, wherein the knowledge graph is one of a plurality of knowledge graphs, wherein the table enrichment engine is configured to identify non-matching properties and obtain property values associated with the non-matching properties from the plurality of knowledge graphs.

Clause 20. One or more computer-readable media having encoded thereon computer-executable instructions causing one or more processors to perform a method comprising: receiving a source table containing data tuples and a source schema defining attributes of the data tuples; matching the source schema to an ontology of a knowledge graph, wherein the knowledge graph comprises a plurality of instances and the ontology defines properties of the plurality of instances; linking the data tuples to respective instances in the knowledge graph; identifying non-matching properties of the respective instances, wherein the non-matching properties are defined in the ontology and not matched to the source schema; obtaining property values associated with the non-matching properties from the knowledge graph; ranking the non-matching properties of the respective instances so as to create a ranked list of non-matching properties and the associated property values; presenting the ranked list of non-matching properties and the associated property values on a user interface; from the ranked list of non-matching properties presented on the user interface, selecting one or more selected non-matching properties; and adding the one or more selected non-matching properties and the associated property values to respective data tuples of the source table.

Example 21—Example Alternatives

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

The invention claimed is:

1. A computer-implemented method, implemented by one or more computing devices comprising at least one hardware processor and one or more tangible memories coupled to the at least one hardware processor, the method comprising:
receiving a source table containing data tuples and a source schema defining attributes of the data tuples;
matching the source schema to an ontology of a knowledge graph, wherein the knowledge graph comprises a plurality of instances and the ontology defines properties of the plurality of instances;
linking the data tuples to respective instances in the knowledge graph;
identifying non-matching properties of the respective instances, wherein the non-matching properties are defined in the ontology and not matched to the source schema;
obtaining property values associated with the non-matching properties from the knowledge graph; and
adding one or more of the non-matching properties and the associated property values to respective data tuples of the source table.

2. The method of claim 1, further comprising creating a ranked list of non-matching properties and the associated property values, wherein the creating comprises ranking the non-matching properties of the respective instances.

3. The method of claim 2, further comprising presenting the ranked list of non-matching properties and the associated property values on a user interface, and receiving an input from the user interface indicating which non-matching properties and the associated properties values are added to respective data tuples of the source table.

4. The method of claim 2, wherein ranking the non-matching properties of the respective instances comprises counting instances in the knowledge graph having property values associated with the non-matching properties.

5. The method of claim 1, further comprising logging data linkage information, wherein the data linkage information records at least which non-matching properties have been added to respective data tuples of the source table.

6. The method of claim 5, further comprising ranking the non-matching properties of the respective instances based on previously logged data linkage information.

7. The method of claim 1, further comprising assigning a null value to a data tuple of the source table if a corresponding non-matching property of the respective instance linked to the data tuple has no associated property value or if the data tuple is not linked to a respective instance in the knowledge graph.

8. The method of claim 7, further comprising ranking the non-matching properties of the respective instances based on minimizing a total number of null values assigned to the data tuple of the source table.

9. The method of claim 1, further comprising mapping the data tuples to respective property tuple lists, wherein a property tuple list corresponds to a respective instance linked to the data tuple and comprises one or more pairs of non-matching property and property value associated with the non-matching property.

10. The method of claim 1, wherein the knowledge graph is one of a plurality of knowledge graphs, wherein the method further comprises identifying non-matching properties and obtaining property values associated with the non-matching properties from the plurality of knowledge graphs.

11. A system comprising:
one or more processors; and
memory coupled to the one or more processors comprising instructions causing the one or more processors implementing a table enrichment engine, wherein the table enrichment engine comprises:
a user interface configured to receive a source table containing data tuples and a source schema defining attributes of the data tuples;
a schema matching operator configured to match the source schema to an ontology of a knowledge graph, wherein the knowledge graph comprises a plurality of instances and the ontology defines properties of the plurality of instances;
an instance linking operator configured to link the data tuples to respective instances in the knowledge graph;
a new property finder configured to identify non-matching properties of the respective instances, wherein the non-matching properties are defined in the ontology and not matched to the source schema;
a property value retriever configured to obtain property values associated with the non-matching properties from the knowledge graph; and
an inserter configured to add one or more of the non-matching properties and the associated property values to respective data tuples of the source table.

12. The system of claim 11, wherein the table enrichment engine further comprises a ranking operator configured to rank the non-matching properties of the respective instances so as to create a ranked list of non-matching properties and the associated property values.

13. The system of claim 12, wherein the user interface is configured to present the ranked list of non-matching properties and the associated property values to a user, and receive an input from the user indicating which non-matching properties and the associated property values are added to respective data tuples of the source table.

14. The system of claim 12, wherein the ranking operator is configured to rank the non-matching properties of the respective instances based on counting instances in the knowledge graph having property values associated with the non-matching properties.

15. The system of claim 12, wherein the table enrichment engine further comprises a data logger configured to log data linkage information, wherein the data linkage information records at least which non-matching properties have been added to respective data tuples of the source table.

16. The system of claim 15, wherein the ranking operator is configured to rank the non-matching properties of the respective instances based on previously logged data linkage information.

17. The system of claim 12, wherein the inserter is configured to assign a null value to a data tuple of the source table if a corresponding non-matching property of the respective instance linked to the data tuple has no associated property value or if the data tuple is not linked to a respective instance in the knowledge graph.

18. The system of claim 17, wherein the ranking operator is configured to rank the non-matching properties of the respective instances based on minimizing a total number of null values assigned to the data tuple of the source table.

19. The system of claim 11, wherein the knowledge graph is one of a plurality of knowledge graphs, wherein the table enrichment engine is configured to identify non-matching properties and obtain property values associated with the non-matching properties from the plurality of knowledge graphs.

20. One or more non-transitory computer-readable media having encoded thereon computer-executable instructions causing one or more processors to perform a method comprising:
receiving a source table containing data tuples and a source schema defining attributes of the data tuples;
matching the source schema to an ontology of a knowledge graph, wherein the knowledge graph comprises a plurality of instances and the ontology defines properties of the plurality of instances;
linking the data tuples to respective instances in the knowledge graph;
identifying non-matching properties of the respective instances, wherein the non-matching properties are defined in the ontology and not matched to the source schema;
obtaining property values associated with the non-matching properties from the knowledge graph; and
adding one or more of the non-matching properties and the associated property values to respective data tuples of the source table.

* * * * *